United States Patent [19]

Petri

[11] Patent Number: 5,564,219
[45] Date of Patent: Oct. 15, 1996

[54] FISHING LURE

[76] Inventor: Stephen J. Petri, 381 Kelp Rd., Copiague, N.Y. 11726

[21] Appl. No.: 452,384

[22] Filed: May 26, 1995

[51] Int. Cl.$^6$ ........................................... A01K 85/00
[52] U.S. Cl. .............................. 43/42.28; 43/42.38
[58] Field of Search .................... 43/42.3, 42.37, 43/42.38, 42.09, 42.45, 42.24, 42.28

[56] References Cited

U.S. PATENT DOCUMENTS

| 3,971,152 | 7/1976 | Husson | 43/42.38 |
|---|---|---|---|
| 4,123,870 | 11/1978 | Wiskirchen | 43/42.32 |
| 4,219,956 | 9/1980 | Hedman | 43/42.28 |
| 4,858,367 | 8/1989 | Rabideau | 43/42.28 |
| 4,993,183 | 2/1991 | Carver | 43/42.24 |
| 5,193,299 | 3/1993 | Correll | 43/42.24 |
| 5,276,993 | 1/1994 | Rosenblatt | 43/42.24 |
| 5,381,620 | 1/1995 | Gibbs | 43/42.09 |

Primary Examiner—Joseph J. Hail, III
Assistant Examiner—James Miner
Attorney, Agent, or Firm—Michael I. Kroll

[57] ABSTRACT

An improved fishing lure comprising a weighted head and a flexible body. A structure is for retaining the weighted head to the flexible body. A fishhook extends between the weighted head and the flexible body.

1 Claim, 2 Drawing Sheets

FISHING LURE

BACKGROUND OF THE INVENTION

The instant invention is the subject matter of Disclosure Document No.: 372979, filed in the PTO on Mar. 21, 1995, and it is respectfully requested that this document be retained beyond the two-year period so that it may be relied upon as evidence of conception of the invention during the prosecution phase of this application, should the need arise.

1. Field of the Invention

The instant invention relates generally to fishing tackle and more specifically it relates to an improved fishing lure.

Many types of live bait and a thousand different types of artificial lures may be cast with a bait-casting rod and reel. Of the lures, plugs made out of wood or plastic into many different shapes and sizes are the most common. Most often they are fashioned to resemble some type of live bait, such as a minnow, crayfish, or frog. Lures known as spoons are made with shiny silver, cooper, or bronze finishes. These wobble and flash when pulled through the water. There are diving (weighted) plugs for fishing in deep water, light wiggling plugs for splashing along the surface, feathered plugs, and shiny metal spoons and weighted spinners with colored deer hair and rubber legs attached to them. There are plugs made from actual small minnows embedded in transparent plastic and a host of other variations. Many have triple gangs of hooks hanging form the middle and rear.

2. Description of the Prior Art

Numerous fishing tackle have been provided in prior art that are adapted to be used by the fishermen in catching fish. While these units may be suitable for the particular purpose to which they address, they would not be as suitable for the purposes of the present invention as heretofore described.

SUMMARY OF THE INVENTION

A primary object of the present invention is to provide an improved fishing lure that will overcome the shortcomings of the prior art devices.

Another object is to provide an improved fishing lure that is used by fisherman in pursuit of larger fish such as striped bass and blue fish.

An additional object is to provide an improved fishing lure that simulates a flounder or fluke type fish, which is the favorite fish food of the striped bass and blue fish, whereby it will be cast or drifted along the bottom of a body of water to catch the striped bass and blue fish.

A further object is to provide an improved fishing lure that is simple and easy to use.

A still further object is to provide an improved fishing lure that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein.

Similar reference characters denote corresponding features consistently throughout the attached drawings.

DETAILED DESCRIPTION OF THE PREFERRED EMBODIMENTS

Figure 1:
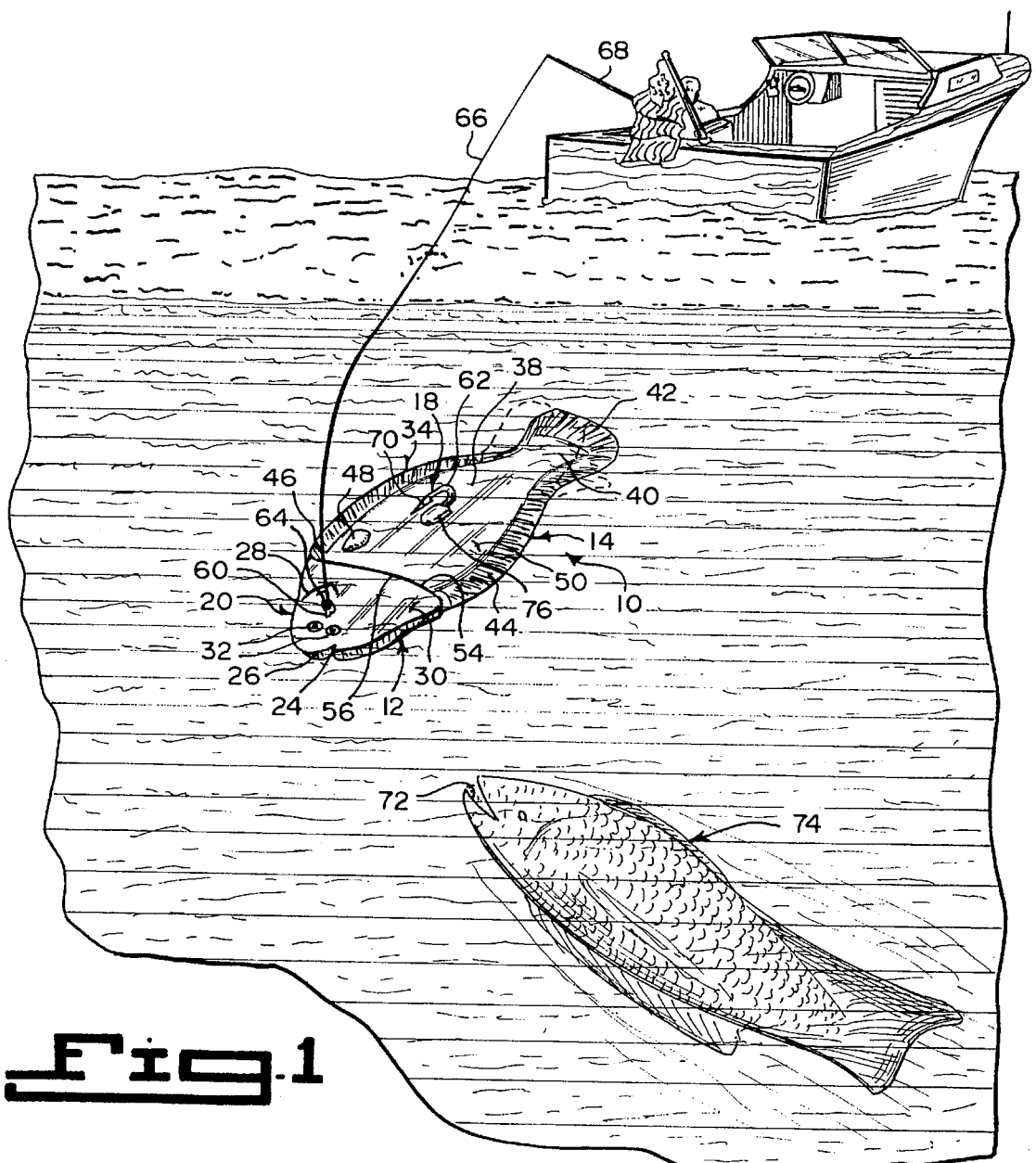
FIG. 1 is a perspective view showing the instant invention in use.
Figure 2:
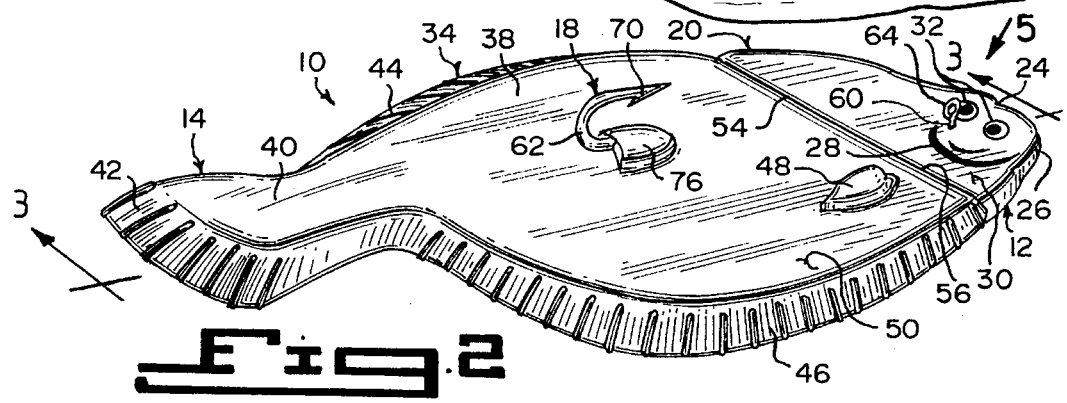
FIG. 2 is a rear perspective view of the instant invention.
Figure 3:
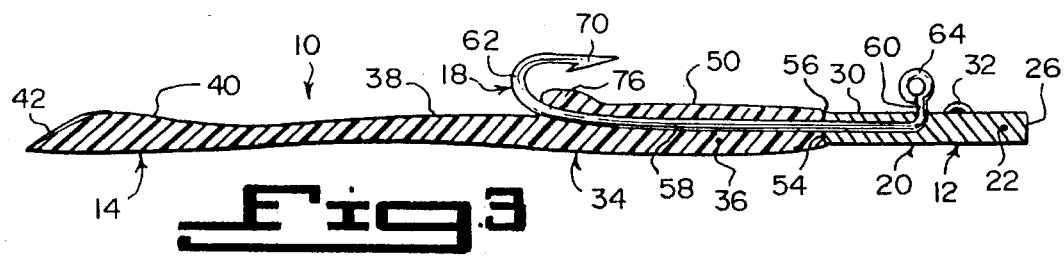
FIG. 3 is a cross sectional view taken along line 3—3 in FIG. 2.
Figure 4:
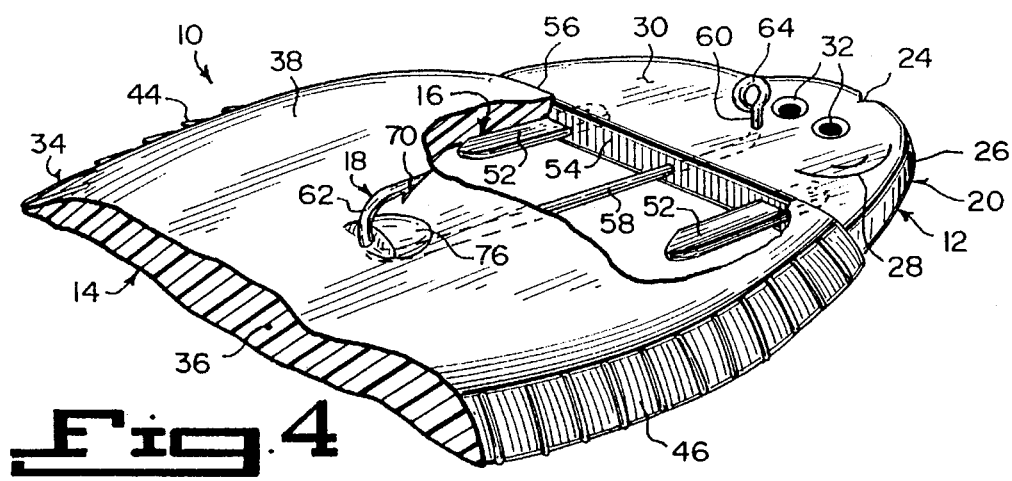
FIG. 4 is an enlarged rear perspective view with parts broken away and in section, showing the internal components in the instant invention.
Figure 5:
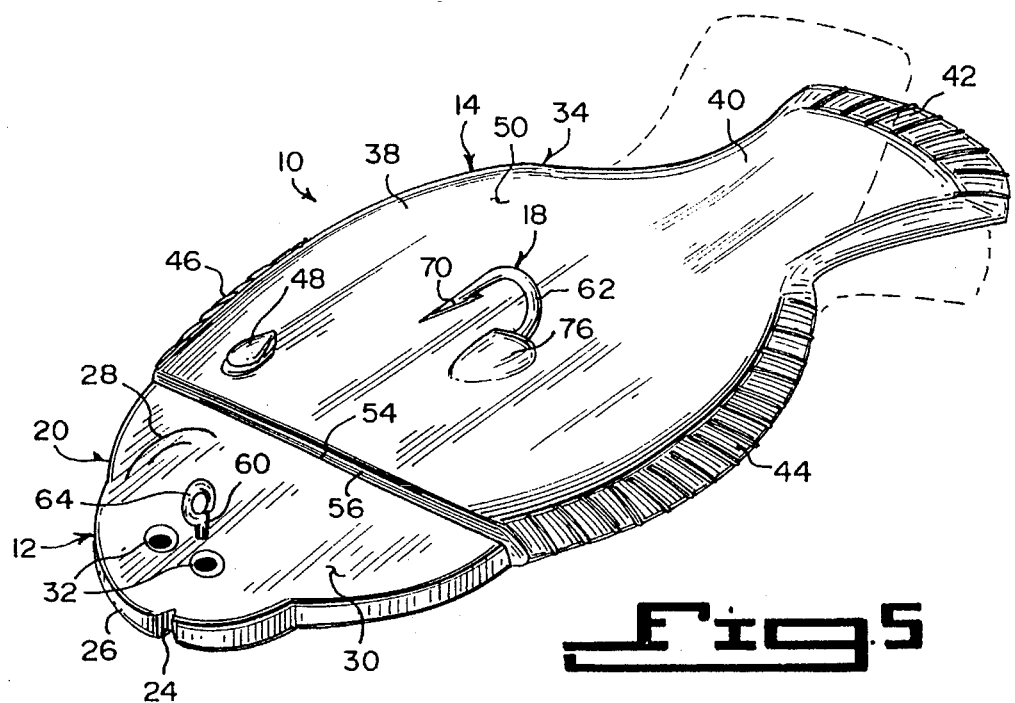
FIG. 5 is a front perspective view taken in the direction of arrow 5 in FIG. 3.

Turning now descriptively to the drawings, in which similar reference characters denote similar elements throughout the several views, FIGS. 1 through 5 illustrate an improved fishing lure 10, comprising a weighted head 12 and a flexible body 14. A structure 16 is for retaining the weighted head 12 to the flexible body 14. A fishhook 18 extends between the weighted head 12 and the flexible body 14.

The weighted head 12 is a flat generally triangular shaped member 20. The weighted head 12 is fabricated out of a heavy metal material 22, such as lead.

The weighted head 12 includes a simulated mouth 24 formed on a forward edge 26 thereof. A simulated gill 28 is painted on a top surface 30. A pair of simulated plastic eyes 32 are affixed to the top surface 30 to further enhance the appearance of the weighted head 12, so as to make it look like a flounder fish head.

The flexible body 14 is a flat generally oval shaped piece 34. The flexible body 14 is fabricated out of a soft rubber-like plastic material 36.

The flexible body 14 consists of a simulated trunk 38. A simulated tail 40 is integral with and extends from the trunk 38. A simulated tail fin 42 is formed on a distal end of the simulated tail 40. A simulated dorsal fin 44 is formed on one side of the simulated trunk 38. A simulated ventral fin 46 is formed on an opposite side of the simulated trunk 38. A raised simulated pectoral fin 48 is formed on a top surface 50 of the simulated trunk 38, to further enhance the appearance of the flexible body 14, so as to make it look like a flounder fish body.

The retaining structure 16 comprises a pair of holding pins 52. The holding pins 52 are spaced apart and partially embedded into a rearward edge 54 of the weighted head 12. The holding pins 52 can extend longitudinally into a forward edge 56 of the flexible body 14, when the weighted head 12 butts up against the flexible body 14.

The fishhook 18 includes an elongated shank 58 having a first end 60 bent at a right angle and a second end 62 bent in a generally U-shaped configuration. A hook eye 64 is formed on the first bent end of the elongated shank 58, which connects to a fishing line 66 from a fishing rod 68, as shown in FIG. 1. A barb 70 is formed on the second bent end 62 of the elongated shank 58, so as to engage within a mouth 72 of a fish 74 to be caught, also shown in FIG. 1.

The elongated shank 58 of fishhook 18 adjacent the hook eye 64 is embedded centrally into the weighted head 12. The elongated shank 58 will extend longitudinally out of the rearward edge 54 of the weighted head 12 and into the forward edge 56 of the flexible body 14. The hook eye 64 projects upwardly through the top surface 30 of the weighted head 12. The barb 70 projects upwardly through the top surface 50 of the flexible body 14.

The flexible body 14 includes a raised bump 76 at the top surface 50 adjacent the second end 62 of the elongated shank 58 below the barb 70, to prevent the flexible body 14 from tearing.

OPERATION OF THE INVENTION

To use the improved fishing lure 10, the following steps should be taken:

1. Attach the end of the fishing line 66 to the hook eye 64 on the fishhook 18.
2. Cast the improved fishing lure 10 into a body of water, so that it will drop to the bottom.
3. Drag the improved fishing lure 10 along the bottom, so that the tail 40 with the tail fin 42 on the flexible body 14 will flip up and down to attract the fish 74, which can be a striped bass or blue fish, since the improved fishing lure 10 looks like a flounder which is the favorite food fish of the striped bass and blue fish.
4. Pull the fishing line 66 when the mouth 72 of the fish 74 engages with the barb 70, so that the fish 74 will be caught.

LIST OF REFERENCE NUMBERS 10 improved fishing lure
12 weighted head of 10
14 flexible body of 10
16 retaining structure for 12 and 14
18 fishhook of 10
20 flat generally triangular shaped member for 12
22 heavy metal material of 12
24 simulated mouth on 26
26 forward edge of 12
28 simulated gill on 30
30 top surface of 12
32 simulated plastic eye on 30
34 flat generally oval shaped piece for 14
36 soft rubber-like plastic material of 14
38 simulated trunk of 14
40 simulated tail of 14
42 simulated tail fin on 40
44 simulated dorsal fin on 38
46 simulated ventral fin on 38
48 raised simulated pectoral fin on 50
50 top surface of 38
52 holding pin of 16
54 rearward edge of 12
56 forward edge of 14
58 elongated shank
60 first bent end of 58
62 second bent end of 58
64 hook eye on 60
66 fishing line on 68
68 fishing rod
70 barb on 62
72 mouth of 74
74 fish
76 raised bump on 50

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An improved fishing lure comprising:

a) a weighted head, said weighted head being a flat generally triangular shaped member, said weighted head being fabricated out of a heavy metal material, said weighted head including a simulated mouth formed on a forward edge thereof, a simulated gill painted on a top surface, and a pair of simulated plastic eyes affixed to the top surface to further enhance the appearance of said weighted head, so as to make the weighted head flounder fish head shaped;

b) a flexible body, said flexible body being a flat generally oval shaped piece, said flexible body being fabricated out of a material selected from a group of materials consisting of soft rubber and soft plastic, said flexible body including a simulated trunk, a simulated tail integral with and extending from said trunk, a simulated tail fin formed on a distal end of said simulated tail, a simulated dorsal fin formed on one side of said simulated trunk, a simulated ventral fin formed on an opposite side of said simulated trunk, and a raised simulated pectoral fin formed on a top surface of said simulated trunk, to further enhance the appearance of said flexible body, so as to make the flexible body flounder fish body shaped;

c) means for retaining said weighted head to said flexible body, said retaining means including a pair of holding pins, said holding pins being spaced apart and partially embedded into a rearward edge of said weighted head, so that said holding pins can extend longitudinally into a forward edge of said flexible body, when said weighted head butts up against said flexible body, d) a fishhook extending between said weighted head and said flexible body, said fishhook including an elongated shank having a first end bent at a right angle and a second end bent in a generally U-shaped configuration, a hook eye formed on said first bent end of said elongated shank, which connects to a fishing line from a fishing rod, and a barb formed on said second bent end of said elongated shank, so as to engage within a mouth of a fish to be caught, said elongated shank of said fishhook adjacent said hook eye being embedded centrally into said weighted head, so that said elongated shank will extend longitudinally out of a rearward edge of said weighted head and into a forward edge of said flexible body with said hook eye protecting upwardly through a top surface of said weighted head and said barb projecting upwardly through a top surface of said flexible body, and said flexible body including a raised bump at said top surface adjacent said second end of said elongated shank below said barb, to prevent said flexible body from tearing.

* * * * *